(12) United States Patent
Brun et al.

(10) Patent No.: US 7,977,605 B2
(45) Date of Patent: Jul. 12, 2011

(54) HEATING ASSEMBLY COMPRISING A PTC ELEMENT, IN PARTICULAR FOR A MOTOR VEHICLE

(75) Inventors: Michel Brun, Rustenhard (FR); Pascal Miss, Sélestat (FR); Mathieu Mougey, Ensisheim (FR)

(73) Assignee: Behr France Rouffach SAS, Rouffach (FR)

( * ) Notice: Subject to any disclaimer, the term of this patent is extended or adjusted under 35 U.S.C. 154(b) by 894 days.

(21) Appl. No.: 10/574,542

(22) PCT Filed: Sep. 15, 2004

(86) PCT No.: PCT/EP2004/010330
§ 371 (c)(1),
(2), (4) Date: May 3, 2007

(87) PCT Pub. No.: WO2005/037584
PCT Pub. Date: Apr. 28, 2005

(65) Prior Publication Data
US 2008/0053980 A1 Mar. 6, 2008

(30) Foreign Application Priority Data
Oct. 7, 2003 (EP) .................................. 03292476

(51) Int. Cl.
*B60L 1/02* (2006.01)
*F28D 7/00* (2006.01)

(52) U.S. Cl. ........ 219/202; 219/201; 219/540; 219/541; 219/530; 392/496; 392/485; 165/299; 165/300; 165/41; 165/72; 165/76; 165/151; 165/148; 165/143

(58) Field of Classification Search .............. 219/201–2, 219/540–1, 530; 392/496, 485; 165/299, 165/300, 41, 172–6, 151, 148, 143
See application file for complete search history.

(56) References Cited

U.S. PATENT DOCUMENTS

| 5,057,672 | A | 10/1991 | Bohlender et al. |
| 5,109,755 | A | 5/1992 | Guillemin |
| 6,124,570 | A | 9/2000 | Ebner |
| 6,265,692 | B1 * | 7/2001 | Umebayahi et al. .......... 219/202 |
| 6,472,645 | B1 | 10/2002 | Bohlender |
| 7,098,426 | B2 | 8/2006 | Bohlender |
| 2005/0072774 | A1 | 4/2005 | Bohlender |

FOREIGN PATENT DOCUMENTS

| DE | 100 12 320 A1 | 9/2000 |
| DE | 101 44 757 A1 | 3/2003 |
| EP | 0 350 528 A1 | 1/1990 |
| EP | 1 061 776 A1 | 12/2000 |
| EP | 1 340 638 A2 | 9/2003 |
| EP | 1 432 287 A1 | 6/2004 |
| EP | 1486363 A1 | 12/2004 |
| WO | WO 03/002920 A1 | 1/2003 |

* cited by examiner

*Primary Examiner* — Shawntina Fuqua
(74) *Attorney, Agent, or Firm* — Muncy, Geissler, Olds & Lowe, PLLC

(57) ABSTRACT

The invention relates to a heating assembly (1) comprising at least one PCT element, in particular for a motor vehicle, said PCT element (2) being located between two contact sheets (3, 4), which are used to make electrical contact. According to the invention, the heating assembly (1) comprises a frame (7) and at least one of the two contact sheets (3)comprises a staggered section outside the frame (7), said staggered section of the projecting part (10) of the contact sheet (3) running parallel with the remaining part (11) of said sheet (3).

19 Claims, 2 Drawing Sheets

HEATING ASSEMBLY COMPRISING A PTC ELEMENT, IN PARTICULAR FOR A MOTOR VEHICLE

FIELD OF THE INVENTION

The invention relates to a heating assembly with a PTC (positive thermal coefficient) element, in particular for a motor vehicle.

BACKGROUND OF THE INVENTION

DE 101 44 757 A1 discloses a heating assembly with a PTC element for passenger vehicles, a supplementary heating system being provided, having a heating element through which heating air flows during operation of the supplementary heating system and having at least one air outlet opening in the foot region of a passenger compartment, to which the heating air is conducted. To allow a vertical temperature stratification that is also comfortable in particular for seats at the rear to be produced in the passenger compartment in a flexible way, the heating element takes the form of an electrical PTC element, which is arranged directly at the air outlet opening in the foot region. A supplementary heater of this type still leaves something to be desired. According to one disclosed exemplary embodiment, a PTC element in the form of a number of heating honeycombs is arranged in a plastic frame (not described in any more detail), which surrounds the air outlet opening.

SUMMARY OF THE INVENTION

The object of the invention is to provide an improved heating assembly with a PTC element.

According to the invention, a heating assembly with at least one PTC element is provided, which PTC element is arranged between two contact plates which serve for making electrical connection, at least one of the two contact plates having an offset outside the frame, and the offset part of the projecting part of the contact plate running parallel to the remaining part of the contact plate. This makes easier insertion possible.

It is preferred for the frame to be formed in an insulating manner, preferably from polyamide.

The frame has spacers, which are arranged between mutually assigned contact plates. These spacers serve for keeping the contact plates apart and preferably also for the attachment of the individual heating sections in the frame. For this purpose, two spacers are provided on mutually opposite sides of the frame for each pair of mutually assigned contact plates.

It is preferred for there to be formed between neighboring heating sections a distance which is respectively formed by a PTC element, a pair of mutually assigned contact plates and corrugated ribs.

The contact plates and the PTC element and/or the contact plates and the corrugated ribs are preferably securely bonded to one another by means of an adhesive or a solder. Such bonds can be produced easily and at low cost.

A further plate is preferably attached to the corrugated rib on the side opposite from the contact side of the contact plate and the corrugated rib. This may be a plate of an electrically insulating material, for example polyamide, or a plate of aluminum.

BRIEF DESCRIPTION OF THE DRAWINGS

The invention is explained in detail below on the basis of two exemplary embodiments with reference to the drawing, in which.

DETAILED DESCRIPTION

Figure 1:
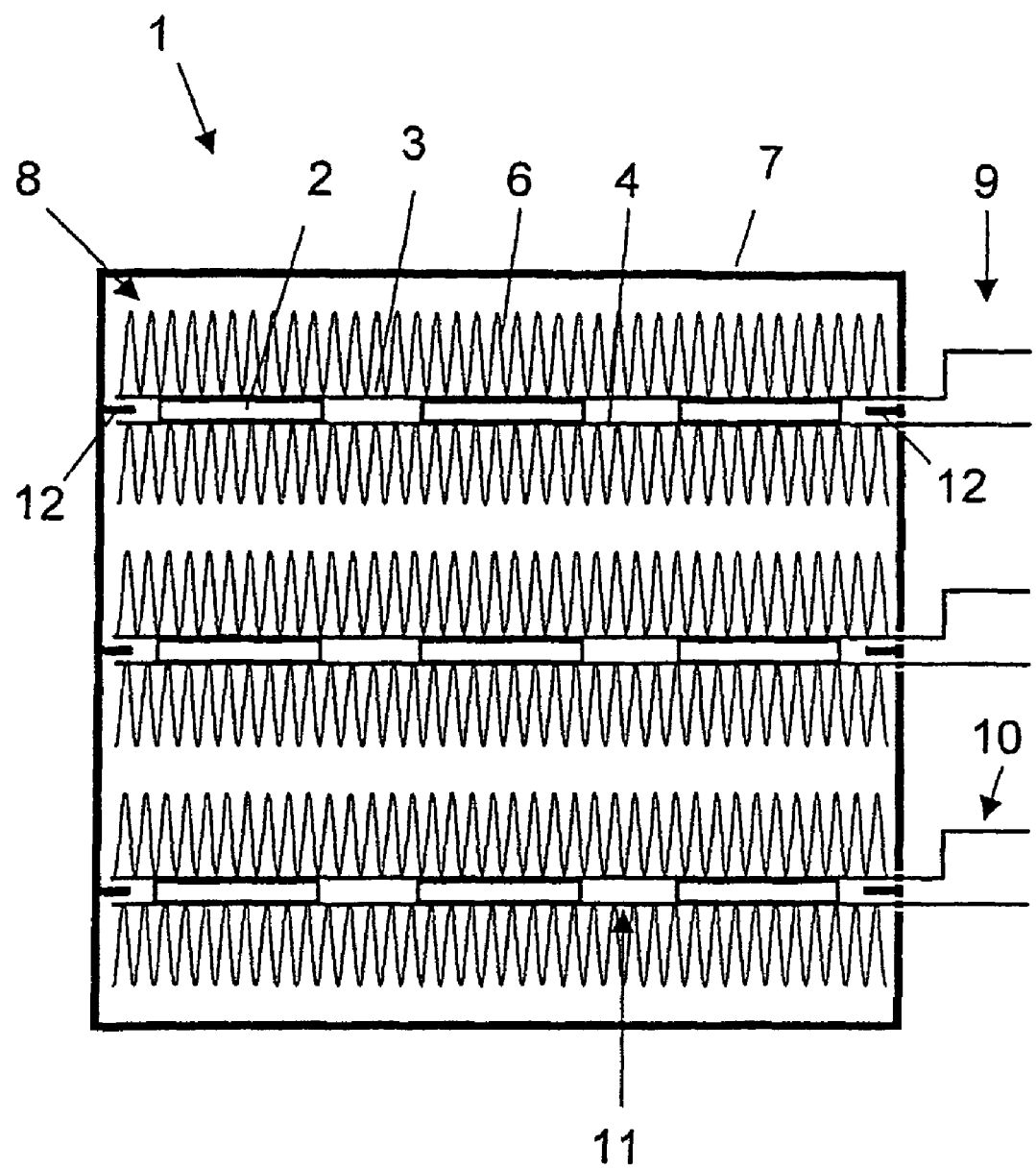
FIG. 1 shows a view of a heating assembly according to the first exemplary embodiment.

In the case of a PTC heating assembly 1 according to a first exemplary embodiment with a ceramic PTC element 2, the PTC element 2 is bonded in place between two contact plates 3 (positive terminal) and 4 (negative terminal) that are arranged parallel to each other, in the present case by means of an adhesive (not represented). Alternatively, a soldered bond may also be provided for example. Corrugated ribs 6 are attached by means of a corresponding adhesive bond on those sides of the contact plates 3 and 4 which in each case lie opposite the PTC element 2. Two corrugated ribs 6, two contact plates 3 and 4 and a PTC element 2 respectively form a heating section 8. The heating assembly 1 is formed by a plurality of heating sections 8, only three heating sections 8 being represented in FIG. 1. Arranged around the heating assembly 1 described above is a plastic frame 7, in the present case of polyamide. The flow direction of the air is in the viewing direction in the case of FIG. 1.

Between the contact plates 3 and 4 there is a voltage of 13 V, but the voltage may also be greater, for example 48 V. The contact plates 3 and 4 project on one side of the plastic frame 7, forming a plug 9. In this case, the projecting part 10 of the first contact plate 3 is bent twice by 90° in such a way that the projecting part 10 runs parallel to the remaining part 11, which is arranged in the plastic frame 7, whereby the distance between the two contact plates 3, 4 is increased outside the plastic frame 7.

To keep the two contact plates 3 and 4 spaced apart, spacers 12 are provided, formed on the plastic frame 7 as inwardly protruding webs, and penetrating between the contact plates 3 and 4 from the ends of the same on one side. On the other side, in the region of the end of the remaining part 11, the spacer 12 is arranged between the two contact plates 3 and 4. The spacers 12 also serve for fastening the individual heating sections 8 in the plastic frame 7.

The heating sections 8 may serve here as standard elements which can be fitted into different frames, thereby reducing the production costs.

Figure 2:
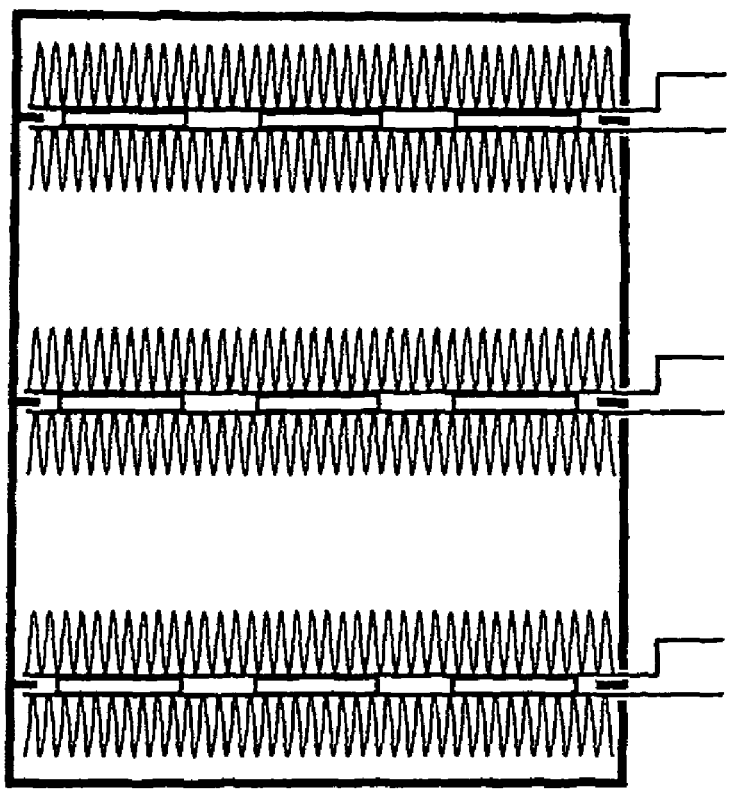
FIG. 2 shows a view of a heating assembly according to a modification of the first exemplary embodiment.

According to a modification of the first exemplary embodiment that is represented in FIG. 2, the distance between two neighboring heating sections 8 is made larger, so that the pressure drop of the air is reduced. The same heating sections 8 as in the case of the basic form described above can be used here.

Figure 3:
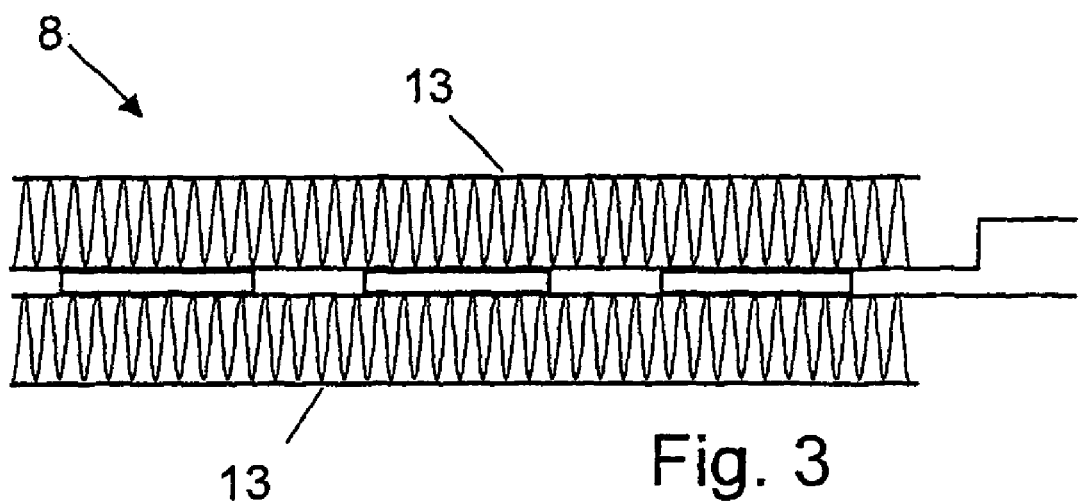
FIG. 3 shows a view of a heating assembly according to the second exemplary embodiment.

FIG. 3 shows a heating section 8 according to a second exemplary embodiment, a plate 13, which comprises an insulating material, in the present case polyamide, in each case being provided on the outer side of the heating section 8. In this case, the plates 13 may be securely attached to the corrugated rib 6 by means of adhesion (same adhesive as is used for bonding the PTC element 2 and the contact plates 3 and 4 and/or for bonding the contact plate 3 or 4 and the corrugated rib 6) or by means of a soldered bond.

LIST OF DESIGNATIONS 1 heating assembly
2 PTC element
3 contact plate 4 contact plate
6 corrugated rib
7 plastic frame
8 heating section
9 plug
10 projecting part
11 remaining part
12 spacer
13 plate

The invention claimed is:

1. A heating assembly comprising:
   at least one PTC element, the PTC element being arranged between two contact plates that are adapted to provide an electrical connection; and
   a frame and at least one corrugated rib inside the frame,
   wherein at least one of the two contact plates extends through the frame and has an offset part outside the frame, the offset part running parallel to a remaining part of the contact plate.

2. The heating assembly as claimed in claim 1, wherein the frame is formed in an insulating manner.

3. A heating assembly comprising:
   at least one PTC element arranged between two contact plates which serve for making electrical connection; and
   a frame,
   wherein at least one of the two contact plates has an offset part outside the frame, the offset part of the contact plate running parallel to a remaining part of the contact plate, and
   wherein the frame has spacers, which are arranged between mutually assigned contact plates.

4. The heating assembly as claimed in claim 3, wherein two spacers are provided on mutually opposite sides of the frame for each pair of mutually assigned contact plates.

5. The heating assembly as claimed in claim 1, wherein the heating assembly comprises a number of independent heating sections.

6. The heating assembly as claimed in claim 1, wherein the contact plates and the PTC element are bonded to one another by means of an adhesive or a solder.

7. The heating assembly as claimed in claim 1, wherein the contact plates and the corrugated ribs are bonded to one another by means of an adhesive or a solder.

8. The heating assembly as claimed in claim 1, wherein a further plate is attached to the corrugated rib on the side opposite from the contact side of the contact plate and the corrugated rib.

9. The heating assembly as claimed in claim 8, wherein the plate comprises an insulating material.

10. The heating assembly as claimed in claim 8, wherein the plate comprises aluminum.

11. The heating assembly as claimed in claim 5, wherein between neighboring heating sections there is formed a distance which is respectively formed by a PTC element, a pair of mutually assigned contact plates and corrugated ribs.

12. The heating assembly as claimed in claim 1, where one of the at least two contact plates does not include an offset portion, said one of the at least two contact plates having a planar surface in contact with the PTC element, said planar surface lying entirely in one plane.

13. A heating assembly comprising:
    a frame;
    a first electrically conducting contact plate having a length, a width and a thickness supported in the frame;
    a second electrically conductive contact plate having a length, a width and a thickness supported in the frame; and
    at least one positive thermal coefficient (PTC) element arranged between the first and second contact plates,
    wherein the first contact plate includes a main body and an extension of the main body in the length direction projecting outside the frame, the extension of the main body including an offset part substantially parallel to the main body, and
    wherein the extension of the main body extends through an opening in the frame.

14. The heating assembly as claimed in claim 13, wherein the second contact plate has a first surface contacting the PTC element, said first surface lying entirely in a single plane.

15. The heating assembly as claimed in claim 13, wherein the PTC element contacts a first surface of the first contact plate, the first surface extending in the length and width directions.

16. The heating assembly as claimed in claim 13, further including at least one corrugated rib element inside the frame.

17. The heating assembly as claimed in claim 13, including third and fourth electrically conducting contact plates inside the frame and contacting another PTC element.

18. The heating assembly as claimed in claim 13, wherein the frame includes at least one spacer between the first contact plate and the second contact plate.

19. The heating assembly as claimed in claim 18, wherein the at least one spacer comprises two spacers provided on opposite sides of the frame.

* * * * *